United States Patent [19]
Forest et al.

[11] 3,871,949
[45] Mar. 18, 1975

[54] FERMENTATION CONTROL-CONTAINING LAMINATE

[76] Inventors: Joseph G. Forest, P.O. Box 29, Waverly, N.Y. 14892; Edward J. Czarnetzky, Box 88, Chazy, N.Y. 12921

[22] Filed: Feb. 11, 1974

[21] Appl. No.: 441,307

Related U.S. Application Data

[63] Continuation-in-part of Ser. No. 263,130, June 15, 1972, abandoned.

[52] U.S. Cl. ............... 161/165, 117/76 P, 117/154, 117/153, 161/160, 161/167, 161/251, 161/270, 162/160, 195/63, 195/64, 195/95, 426/64, 426/323, 426/328
[51] Int. Cl. ............ C09j, B32b 29/06, B32b 27/18
[58] Field of Search .......... 161/160, 165, 251, 270, 161/167; 195/54, 63, 68, 64, DIG. 11; 117/154, 76 P, 153; 162/160, 161; 426/323, 335, 328, 64

[56] References Cited
UNITED STATES PATENTS

| | | | |
|---|---|---|---|
| 2,480,010 | 8/1949 | Flett | 426/323 |
| 2,765,233 | 10/1956 | Sarett | 196/DIG. 11 |
| 2,906,646 | 9/1959 | Smith | 426/323 |
| 3,085,731 | 4/1963 | Wilkins | 117/76 P |
| 3,132,041 | 5/1964 | Pihl | 117/76 P |
| 3,184,314 | 5/1965 | Forest | 426/374 X |
| 3,276,899 | 10/1966 | Muhlberg | 117/76 P |
| 3,560,332 | 2/1971 | Crandall | 117/154 X |
| 3,624,222 | 11/1971 | Nelson | 426/374 X |
| 3,640,791 | 2/1972 | Rosenheim | 161/167 X |
| 3,705,938 | 12/1972 | Hyman | 161/251 |

FOREIGN PATENTS OR APPLICATIONS

| | | | |
|---|---|---|---|
| 893,311 | 4/1962 | United Kingdom | 161/251 |

*Primary Examiner*—George F. Lesmes
*Assistant Examiner*—Ellis P. Robinson
*Attorney, Agent, or Firm*—Robert G. McMorrow

[57] ABSTRACT

A fermentation control-containing laminate for retarding the spoilage of silage and like materials on storage, comprising a polyvinylidene chloride layer and a layer of a Kraft paper impregnated with sodium sulfate and a malt diastase, is disclosed.

19 Claims, No Drawings

FERMENTATION CONTROL-CONTAINING LAMINATE

CROSS-REFERENCE TO RELATED APPLICATIONS

This application is a continuation-in-part application of our earlier co-pending application, Ser. No. 263,130, filed June 15, 1972, now abandoned.

BACKGROUND OF THE INVENTION

1. Field of the Invention

This invention relates to a fermentation control-containing laminate which is suitable for use in retarding the spoilage on storage of silage and like materials. More particularly, this invention relates to a laminate of a polyvinylidene chloride layer or other synthetic resin and a layer of a Kraft or other paper in which the Kraft or other paper contains impregnated therein sodium sulfate and malt diastase as fermentation control and subsequent spoilage inhibitors.

2. Description of the Prior Art

A problem which is encountered in the storage of forages and grains is loss due to spoilage of nutrient value and palatability of the silage to animals. Fermentation generally occurs in silage and the heat which results due to uncontrolled fermentation stimulates the activity of microorganisms which destroys various desired ingredients in silage, such as vitamins, enzymes, proteins, and the like. As a result, storage conditions and methods of minimizing deleterious changes in silage on storage are desired.

As was described above, upon the storage of silage, fermentation occurs, and in silage such as corn, the sugar contained in the corn is converted to organic acids such as lactic and acetic acid. This production of acid generally assists in the preservation of silage. However, an increase in harmful bacteria or molds can occur if uncontrolled. This increase is not always inhibited by the acidity normally present in the silage or formed during storage. This results in a decaying of the silage. Controlled fermentation results in a higher proportion of desirable acids such as propionic.

The loss of nutrients in silage is a result of the oxidation and mold growth which takes place during the normal fermentation process. As a result, part of the nutrient value contained in the silage, principally the sugars, is oxidized to carbon dioxide and water and thus is lost. This not only reduces the value of the silage as a nutrient but together with the mold also makes the silage unpalatable to animals. In addition to this loss of nutrients due to oxidation, loss of silage due to spoilage of the forage in contact with air occurs since the production of desirable acids such as propionic acid and the stimulation of beneficial bacteria is hindered.

Spoilage can also occur in the preparation of feed such as corn meal or grist which, due to the high moisture content contained in the feed material and the heat generated in the grinding of the feed materials, as for example, in the preparation of corn meal or grist, is conducive to molding, thus resulting in waste.

The problems discussed above of storing cereals, grains, grasses, and material having a high moisture content and thus being susceptible to fermentation, results in a molding and a decaying of the stored materials which is not only deleterious to the quality of the silage stored in terms of its nutritional value to animals, but in addition, results in a financial loss to farmers as a result of the necessity for discarding the moldy and decayed material.

In U.S. Pat. No. 3,184,314, Forest, et al, there is disclosed a composition for retarding the spoilage of silage and similar materials upon storage comprising sodium sulfate and malt diastase. That patent also discloses a method for retarding the spoilage of silage and similar materials upon storage which basically comprises impregnating such materials with the aforementioned sodium sulfate/malt diastase composition.

It is therefore the primary object of the present invention to provide a laminate material as herein described which is capable of protecting silage upon storage to the same extent as that provided by the composition described in the Forest, et al patent noted above.

It is another object of this invention to provide a laminate material which can be used to protect silage on storage and which can be successfully employed to retard the processes which occur in storage and which result in deleterious effects to silage on storage.

It is another object of this invention to provide a material which can be employed in storage silos to cover the stored silage and/or line the container permitting the beneficial changes which occur in storage and yet inhibit the deleterious effects which can occur on storage.

It is another object of this invention to provide a material which can be used to preserve silage by controlling the fermentation in the silage and which can effectively maintain a microaerophyllic atmosphere within the silage so that the respiration of the grasses or corn silage is curtailed after they are stored, permitting the green color, carotenes, fresh grass or corn odor, and flavor of the original forage to be retained.

It is also another object of this invention to provide a bagging material which due to its characteristics can prevent molding of bagged cereals and grains, such as wheat, oats, barley, rice and corn, and can also prevent deleterious changes which occur.

It is further another object of this invention to provide a fermentation control-containing laminate which promotes the production of beneficial acids, such as propionic acid as well as beneficial bacteria during the storage of silage.

SUMMARY OF THE INVENTION

These and other objects of this invention can be achieved by covering the silage so stored with or containing the silage so stored in the fermentation control-containing laminate of this invention.

The fermentation control-containing laminate of this invention which can be used for retarding the spoilage of silage and the prevention of molding in bagged cereals and grains and the like on storage comprises a laminate of a polyvinylidene chloride layer and a layer of a Kraft paper which has been impregnated with sodium sulfate and malt diastase.

It is interesting to note that quite unexpectedly, the fermentation control-containing laminate of this invention affords the same fermentation control effect as that observed with the composition of the Forest, et al patent described earlier. This is unique from the standpoint that whereas the composition of the Forest, et al patent was required to be impregnated into the grain mass, the fermentation control-containing laminate of this invention achieves substantial fermentation control per se. That is, silage or similar materials confined to the fermentation control-containing laminate of this invention will exhibit mold free properties to substantially the same extent as that observed with the composition of the Forest, et al patent described earlier.

DETAILED DESCRIPTION OF THE INVENTION

As was described hereinbefore, the fermentation control-containing laminate of this invention comprises a polyvinylidene chloride layer or other non-toxic water insoluble synthetic resin and a layer of a Kraft or other paper of good tensile strength and high absorbency impregnated with sodium sulfate and malt diastase.

The polyvinylidene chloride layer of the laminate of this invention is a polymer of vinylidene chloride and any of the conventionally known film-forming polyvinylidene chlorides or other non-toxic, water insoluble, oxygen and carbon dioxide impervious resins of suitable molecular weights can be employed. The particular molecular weight of the polyvinylidene chloride employed is not critical so long as the molecular weight or the degree of polymerization is sufficiently high that a strong film-forming polymer can be prepared. These polyvinylidene chlorides are conventionally known materials and are articles of commerce. One suitable form of the polyvinylidene chloride useful in the laminate of this invention is marketed by the Dow Chemical Company under the trade name "Saran."

The second layer of the laminate of this invention which is suitable for retarding the spoilage of silage and the like on storage comprises a Kraft paper layer having absorptive properties. Kraft paper is also an article of commerce and is well known. Almost any type of Kraft paper or other strong and inexpensive paper can be used, the only condition being that it be absorptive to the active ingredients impregnated therein, i.e., the sodium sulfate and malt diastase. The weight of the Kraft paper used is not critical and will depend on the end-product use of the laminate. Generally, Kraft papers from a paper of 10 pounds weight up to a paper of one hundred pounds weight can be used with the preferred weight of the Kraft paper ranging from 30 pounds to 60 pounds.

The laminate of this invention can be prepared according to conventionally known techniques, as for example, by extruding a layer of polyvinylidene chloride onto a previously prepared Kraft paper, thereby laminating the polyvinylidene chloride layer to the Kraft paper layer. Any other conventional techniques in which a laminate of a film-forming polymeric layer and a fibrous or a paper layer can be prepared can be employed where desired.

The laminate of this invention can range in thickness from a diaphanous film to a laminate which is several millimeters in thickness. The particular thickness is not critical to the laminate of this invention and will be dependent upon the end use to which the laminate product is subjected. While the thickness is not a critical consideration, generally the thickness of the laminate will range from 25 to 200 mils in thickness, with the polyvinylidene chloride layer ranging from .25 to 100 mils in thickness, preferably from 1.0 to 20 mils in thickness, and the Kraft paper layer ranging from 1.5 to 150 mils in thickness, preferably from 2.5 to 50 mils in thickness. Again, it is to be emphasized that the thickness characteristics of the laminate of this invention will be dependent upon the end use to which the product is to be employed.

The active ingredients, i.e., the sodium sulfate and the malt diastase, can be applied to the Kraft paper layer in any conventional manner. A solution of the sodium sulfate and the malt diastase, in a conventional solvent such as water or an aqueous solution, can be prepared, applied in a conventional manner such as brushing, dipping, spraying and the like to the Kraft paper side of the laminate with the Kraft paper absorbing the solution of sodium sulfate and the malt diastase resulting in the impregnation in the Kraft paper layer of the active ingredients. The amount of the sodium sulfate is not critical and generally the amount of sodium sulfate per square foot of a fifty-pound weight paper will range from .05 to 2.0 pounds per square foot. Where higher weight papers or lower weight papers are employed, the amount of the sodium sulfate can be adjusted proportionally. A preferred embodiment is the use of about four pounds of sodium sulfate for each 30 square feet of the preservative-containing laminate of this invention.

The amount of the malt diastase will generally range from one part to five parts of malt diastase to each fifty parts of sodium sulfate. The ratio of malt diastase to the sodium sulfate is not a critical consideration and any ratio within the above stated ranges is generally suitable. The use of sodium sulfate and malt diastase in combination is disclosed in the Forest, et al patent described earlier.

Since fermentation occurs only after a period of time and since the use of the sodium sulfate and malt diastase is effective upon fermenting of the ensilage, it may be desirable to have a preservative contained in the laminate of this invention which can act immediately.

As an additional embodiment of the laminate of this invention, sodium propionate or calcium propionate as a preservative can also be added to the sodium sulfate and malt diastase mixture to provide this immediate protection in the laminate as a preservative, the amount of sodium propionate or calcium propionate ranging from 0.1 to 1 part for each part of sodium sulfate. In addition, other materials such as inert colorants, e.g., pigments or dyes, can be added to the sodium sulfate-malt diastase solution to provide a color to the Kraft paper layer or, where desired, printing can be applied to the laminate in the form of directions for use or advertisement. Other conventional additives can also be present where desired to change the physical properties of the laminate, for example, in terms of the bagging strength, wet strength of the Kraft paper, and the like.

In addition, the laminate of this invention may contain intermediate layers between the polyvinylidene chloride layer and the Kraft paper layer to provide additional advantageous properties to the laminate of this invention. For example, an intermediate clay layer can be incorporated between the polyvinylidene chloride layer and the Kraft paper layer to minimize absorption of the polyvinylidene chloride into the Kraft paper layer in the preparation of the laminate and thereby provide maximum absorptive capability to the Kraft paper for the impregnation of the sodium sulfate and the malt diastase. Where desired, a thermal insulation layer can also be included. Any of these additional layers are conventional and are not a critical characteristic of the laminate of this invention. For example, where a clay layer is added to prevent absorption of the polyvinylidene layer during laminate formation or staining of alternate layers, any of the conventionally known clays such as bentonite which can be used to size paper, can be employed. The particular type of clay is immaterial to the laminate of this invention as long as it is inert to the active ingredients employed and provides sizing characteristics to the Kraft paper resulting in an inhibition of the absorption of the polyvinylidene chloride by the Kraft paper layer.

As was described above, the impregnation of the paper layer with the active ingredients of sodium sulfate and the malt diastase, and the optional embodiments such as calcium propionate, sodium propionate and colorants, can be accomplished by spraying the Kraft paper layer with a solution of the active ingredients and the application of optional embodiments by brushing the Kraft paper layer with a solution of the active ingredients, e.g., any conventional techniques for the application of a solution onto an absorbent layer can be employed where desired.

To further illustrate the fermentation control-containing laminate of this invention, a laminate was prepared from a polyvinylidene chloride and a forty pound Kraft paper such that the laminate prepared resulted in a paper layer which was approximately four and one-half mils thick and a polyvinylidene chloride layer which was approximately one and one-half mils thick. A twenty percent solution of sodium sulfate containing malt diastase at a level of one part by weight to each 30 parts of sodium sulfate was applied to the Kraft paper side of the laminate. Absorption by the paper of the solution of the sodium sulfate and the malt diastase is such that the Kraft paper contained six percent by weight sodium sulfate, based on the weight of the paper.

This laminate containing the sodium sulfate and the malt diastase was then cut into sheets approximately 5 inches by 5 inches and inserted into quart containers such that the laminate formed a top-to-bottom divider. These containers were then filled with Milo grain (having a moisture content of eighteen percent) or with a high moisture content corn (having a thirty percent moisture content). In another run, quart containers filled with Milo grain (having the moisture content of eighteen percent) and high moisture content corn (having a thirty percent moisture content) was saturated with the sodium sulfate/malt diastase composition of this invention in the manner described in the Forest patent referred to earlier. A control of the laminate was prepared in exactly the same manner with the exception that the Kraft paper layer was not impregnated with the sodium sulfate and malt diastase and was inserted into containers and subsequently filled with Milo grain or high moisture content corn.

Microaerophyllic conditions were established for each of the samples and the containers were set at 79° F. After five days the containers containing the laminate of the invention and the containers containing the Milo grain and high moisture content corn saturated with the sodium sulfate/malt diastase composition were examined with the following results:

| Sample | Results |
| --- | --- |
| Milo with laminate impregnated with sodium sulfate and malt diastase | Mold had grown all over the sides of the container as well as over the top, except for a distance of about one-fourth to one-half inch next to the Kraft paper side of the laminate, both as observed from the ouside of the container and as observed after emptying the container. |
| High moisture corn with laminate impregnated with sodium sulfate and malt diastase | The same results as were obtained above with the Milo were observed, but the mold was much more luxuriant. However, mold was not observed on the Kraft paper side of the laminate similar to the above results. |
| Milo impregnated with sodium sulfate and malt diastase per se | No mold growth was observed |
| High moisture corn impregnated with sodium sulfate and malt diastase | No mold growth was observed. |
| Control (laminate without sodium sulfate and malt diastase) | Molds of several types grew luxuriantly. The Milo sprouted after ten days. Sprouting occurred in all cases with the Milo. The high moisture corn did not sprout. |

The above results show the preservative and protection qualities which can be obtained by employing the preservative-containing laminate of this invention.

Similar results are also obtained where additionally a clay layer is placed intermediate between the polyvinylidene chloride layer and the Kraft paper layer in the preparation of the laminate.

Similar results are also obtained when in addition to the sodium sulfate and malt diastase employed in the above, calcium propionate is also contained therein.

The fermentation control-containing laminate of this invention can be employed in almost any application where protection from moisture and the inhibition of mold growth is desired, inhibiting the action of harmful bacteria causing silage to spoil is sought, and preservation of silage is desired. For example, the fermentation control-containing laminate of this invention can be used as a lining for trench silos to protect from air and moisture and as a covering material for the covering of silage stored in silos, since it not only provides perservatives but also provides a moisture and gas barrier. The preservative-containing laminate of this invention can also be used as a bagging material, as for example where normal moisture content or high moisture corn and other grains are to be bagged and subsequently stored for future use. The fermentation control-containing laminate of this invention can be also used in other applications, as for example as a liner for the holds of ships in which a fungible material is to be stored and transported. The fermentation control-containing laminate of this invention can be used similarly as a liner for shipping crates or bagging materials where molding of fungible materials could cause problems. Similarly, the fermentation control-containing laminate of this invention could be used as a liner for railroad box cars to protect the grain and silage from the effects not only of moisture from the atmosphere but also moisture from condensation. In addition, the fermentation control-containing laminate of this invention can be used in construction as a moisture barrier and a preservative to inhibit the formation of mold in high-moisture areas.

The fermentation control-containing laminate of this invention is oxygen proof, strong, resistant to puncturing and absorptive. The laminate of this invention is also a moisture and carbon dioxide barrier. The ingredients used in the preparation of the laminate of this invention can be of food grade quality and are non-toxic. The laminate of this invention provides a physical barrier to molds, mold spores and the like and a physical barrier to the exchange of gases necessary for the life processes of molds. In addition, the laminate of this invention provides physical bacterialogical and other conditions permitting the formation of specific acids due to fermentation of the sugars contained in ensilage, the acids being specifically inhibitory to mold growth.

In a preferred use of this invention, sheets of the fermentation control-containing laminate of this invention can be used as a cover to protect silage stored in silos. In its use, rolls of the material can be simply laid out on top of the stored ensilage with the edges of the rolls being sealed by the use of a pressure-sensitive adhesive tape or by the application in the manufacture of the fermentation control-containing laminate of this invention of a water-soluble adhesive on the outer surface of the laminate so that the laminate on use can be simply moistened and the adhesive areas stuck together to form a seal. By coverage of silage in this manner, the silage is not only protected from moisture and exposure to oxygen, but in addition the fermentation control-containing material contained in the laminate prevents the growth of mold and the multiplication of bacteria harmful to the storage of silage. The laminate of this invention can be prepared in the form of rolls, cut sheets, folded sheets, and the like.

While the above invention has been described in terms of specific embodiments, it will be apparent to those skilled in the art that additional modifications and changes can be made in the nature of the laminate without departing from the spirit and scope of this invention.

What is claimed is:

1. A fermentation control-containing laminate for retarding the spoilage of silage and the like and for promoting the production of beneficial acids and bacteria during silage storage, which comprises:
   a. a polyvinylidene chloride resin layer, and
   b. a layer of Kraft paper impregnated with sodium sulfate and malt diastase,
      said malt diastase being present in an amount of from one to fifty parts by weight per fifty parts by weight of sodium sulfate.

2. The laminate of claim 1, comprising additionally, a clay layer, which is placed intermediate between said polyvinylidene chloride layer and said Kraft paper layer, the clay in said clay layer being that of a conventional paper sizing clay.

3. The laminate of claim 1, wherein said Kraft paper layer contains additionally, from 0.1 to 1.0 parts by weight of a member selected from the group consisting of sodium propionate and calcium propionate per one part of sodium sulfate employed.

4. The laminate of claim 1, wherein said Kraft paper layer contains additionally, an inert colorant.

5. The laminate of claim 1, wherein said laminate has additionally, a water-soluble adhesive on the outer surface of said laminate.

6. A fermentation control-containing laminate for retarding the spoilage of silage and the like and for promoting the production of beneficial acids and bacteria during silage storage, which comprises:
   a. a polyvinylidene chloride resin layer, and
   b. a layer of Kraft paper impregnated with a 20 percent sodium sulfate solution and malt diastase,
      said malt diastase being present in an amount of from one to fifty parts by weight per fifty parts by weight of sodium sulfate.

7. The laminate of claim 1, wherein the thickness of said polyvinylidene chloride layer ranges from 0.25 to 100 mils.

8. The laminate of claim 7, wherein said thickness ranges from 1.0 to 20 mils.

9. The laminate of claim 1, wherein the thickness of said Kraft paper ranges from 1.5 to 150 mils.

10. The laminate of claim 9, wherein said thickness of said Kraft paper ranges from 2.5 to 50 mils.

11. The laminate of claim 1, wherein the thickness of the entire laminate ranges from 25 to 200 mils.

12. The laminate of claim 1, wherein the amount of sodium sulfate present is approximately four pounds per thirty square feet of said laminate.

13. The laminate of claim 1, wherein said malt diastase is present in an amount of from one to five parts per fifty parts of sodium sulfate.

14. The laminate of claim 6, wherein the amount of sodium sulfate present is approximately four pounds per thirty square feet of said laminate.

15. The laminate of claim 6, wherein said polyvinylidene chloride layer has a thickness ranging from 0.25 to 100 mils.

16. The laminate of claim 15, wherein said thickness ranges from 1.0 to 20 mils.

17. The laminate of claim 6, wherein said Kraft paper layer has a thickness ranging from 1.5 to 150 mils.

18. The laminate of claim 17, wherein said thickness ranges from 2.5 to 50 mils.

19. The laminate of claim 6, wherein said laminate has a thickness of from 25 to 200 mils.

* * * * *